(12) United States Patent
Dodo et al.

(10) Patent No.: US 6,769,266 B2
(45) Date of Patent: Aug. 3, 2004

(54) HEAT AND ELECTRIC POWER SUPPLY SYSTEM AND OPERATION METHOD THEREOF

(75) Inventors: Satoshi Dodo, Mito (JP); Kuniyoshi Tsubouchi, Mito (JP); Norio Yasugahira, Hitachi (JP); Hiroshi Arita, Mito (JP); Yasuaki Akatsu, Hitachi (JP); Shigeo Hatamiya, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 125 days.

(21) Appl. No.: 10/247,344

(22) Filed: Sep. 20, 2002

(65) Prior Publication Data

US 2003/0019229 A1 Jan. 30, 2003

Related U.S. Application Data

(63) Continuation of application No. 09/799,056, filed on Mar. 6, 2001.

(30) Foreign Application Priority Data

Mar. 8, 2000 (JP) .......................................... 2000-68612

(51) Int. Cl.[7] .............................. F28O 5/00; F25B 27/00
(52) U.S. Cl. ...................................... 62/238.3; 62/304
(58) Field of Search ............................... 62/238.3, 304, 62/476, 238.4, 101

(56) References Cited

U.S. PATENT DOCUMENTS

| 4,128,994 A | 12/1978 | Cheng |
| 4,380,909 A | 4/1983 | Sung |
| 4,987,750 A * | 1/1991 | Meckler .................... 62/238.6 |
| 5,203,161 A | 4/1993 | Lehto |
| 5,353,585 A | 10/1994 | Munk |
| 6,247,302 B1 | 6/2001 | Tsukamoto et al. |
| 6,313,544 B1 | 11/2001 | Mongia et al. |

OTHER PUBLICATIONS

Clean Energy, vol. 6, No. 12 (1997, issued by Japan Industry), pp 1 to 36.

* cited by examiner

*Primary Examiner*—Melvin Jones
(74) *Attorney, Agent, or Firm*—Mattingly, Stanger & Malur, P.C.

(57) ABSTRACT

A heat and electric power supply system includes a regenerative gas turbine and an adsorption refrigerator recovering exhaust heat of exhaust gas from the gas turbine and is provided with inlet air cooling equipment including a spray device for spraying cold water from the adsorption refrigerator into an air-intake port of the regenerative gas turbine and a humidifier effecting humidification by hot water injection from the refrigerator into a compressor delivery port of the regenerative gas turbine. The cooling by cold water and humidification by hot water injection are effected according to operational conditions.

12 Claims, 8 Drawing Sheets

HEAT AND ELECTRIC POWER SUPPLY SYSTEM AND OPERATION METHOD THEREOF

This is a continuation application of U.S. Ser. No. 09/799,056, filed Mar. 6, 2001.

BACKGROUND OF THE INVENTION

1. Field of the Invention

The present invention relates to a heat and electric power supply system which generates and supplies heat and electric power at the same time and a method of operating the system.

2. Description of Prior Art

A lot of independent electric power plants, each operating a generator using an internal combustion engine or the like have been proposed as so-called co-generation facilities which generate hot water or steam and cold water by utilizing exhaust heat therefrom and supply thermal energy in the form of cold/heat. Some examples are disclosed in CLEAN ENERGY Vol. 6 No. 12 (1997, issued by JAPAN INDUSTRY) at pages 1 to 36. In many of these plants, a ratio between the maximum quantity electric power which can be supplied and a cold energy quantity or a heat energy quantity is fixed.

A cold/heat/electric power supply system which supplies electric power and thermal energy such as cold/heat at the same time can be realized by a combination of an absorption refrigerator which makes it possible to supply cold water/hot water at the same time by providing a change-over valve inside for example, and a generator which is driven by an internal combustion engine such as a diesel engine, gas engine, gas turbine or the like. Recently, a small-sized regenerative gas turbine provided with a regenerative heat exchanger has been developed and a cold/heat/electric power supply system using such a turbine also has been studied.

An example of a conventional cold/heat/electric power supply system is shown in FIG. 8, which employs a generator driven by a small-sized regenerative gas turbine and an absorption refrigerator. In this system, an exhaust gas 7 from the regenerative gas turbine 1 is led to the absorption refrigerator 2 which recovers heat from the exhaust gas in a regenerator and generates hot water 9 in a condenser and cold water 8 in an evaporator. In such a system as shown by this example, the maximum power generation output is limited by the maximum output of the regenerative gas turbine and it is impossible to increase the power generation output and to increase energy effectively utilized, even in the case where a demand such as air conditioning has decreased in middle season whereby a demand of cold/heat has decreased.

Further, some factors representative of the performance of the conventional system is shown in prior art items of FIG. 2 in the form of comparison of power generation efficiency and output between in the case where the above-mentioned system is operated in middle season (atmospheric temperature 15° C. and humidity 30%) and in the case where the system is operated in summer (atmospheric temperature 38° C. and humidity 60%). In summer, the air density decreases as the temperature increases and a mass flow rate of the air taken in a compressor of the regenerative gas turbine decreases, so that a recovery heat amount in a regenerative heat exchanger of the regenerative gas turbine and turbine output decrease and both the power generation terminal output and power generation efficiency change greatly, as shown in FIG. 2.

SUMMARY OF THE INVENTION

The present invention is made in view of the above-mentioned points, and an object of the present invention is to provide a heat and electric power supply system and an operation method thereof which enables the power generation output to increase.

In order to attain the above-mentioned object, a heat and electric power supply system according to the present invention comprises gas turbine equipment generating electric power, absorption refrigerating equipment recovering exhaust heat from the gas turbine equipment and generating thermal energy, and air cooling equipment fluidly connected to the gas turbine and the absorption refrigerating equipment and cooling air for power generation in the gas turbine equipment with the thermal energy generated in the absorption refrigerating equipment. An example of the air cooling equipment is a spray device for spraying cold water from the absorption refrigerator onto the air to be taken in a compressor of the regenerative gas turbine or a humidifier for humidifying the air from the compressor with hot water from the absorption refrigerator. The system can be provided with a heat recovering device for recovering heat from exhaust gas of the adsorption refrigerator and/or an accumulation type heat exchanger for recovering accumulating heat from exhaust gas of the adsorption refrigerator.

Further, in order to attain the above-mentioned object, according to the present invention, the operation method of a heat and electric power supply system which comprises gas turbine equipment and absorption refrigerating equipment recovering exhaust heat of the gas turbine equipment cooling or heating water, is characterized in that intake air of the gas turbine equipment is cooled by spraying or injecting the water generated in the absorption refrigerator onto the intake air. An example of the water used for cooling the intake water is at least one of cold water and hot water.

DESCRIPTION OF EMBODIMENTS OF THE INVENTION

A heat and electric power supply system (cold/heat/electric power equipment), that is, a system or equipment which is able to jointly supply thermal energy (cold and heat) and electric power, of each embodiment of the present invention relates to a so-called co-generation system. The co-generation system is provided with an electric power generating function to supply electric power to a demandant such as a house, glass culture farm house, small-sized factory, each section of collective houses, hospital, hotel, combined sport facilities, or the like, and supplies cold energy and heat energy to facilities such as air conditioning equipment. Particularly, a system which employs a regenerative gas turbine as a motor will be described hereunder.

Figure 1:
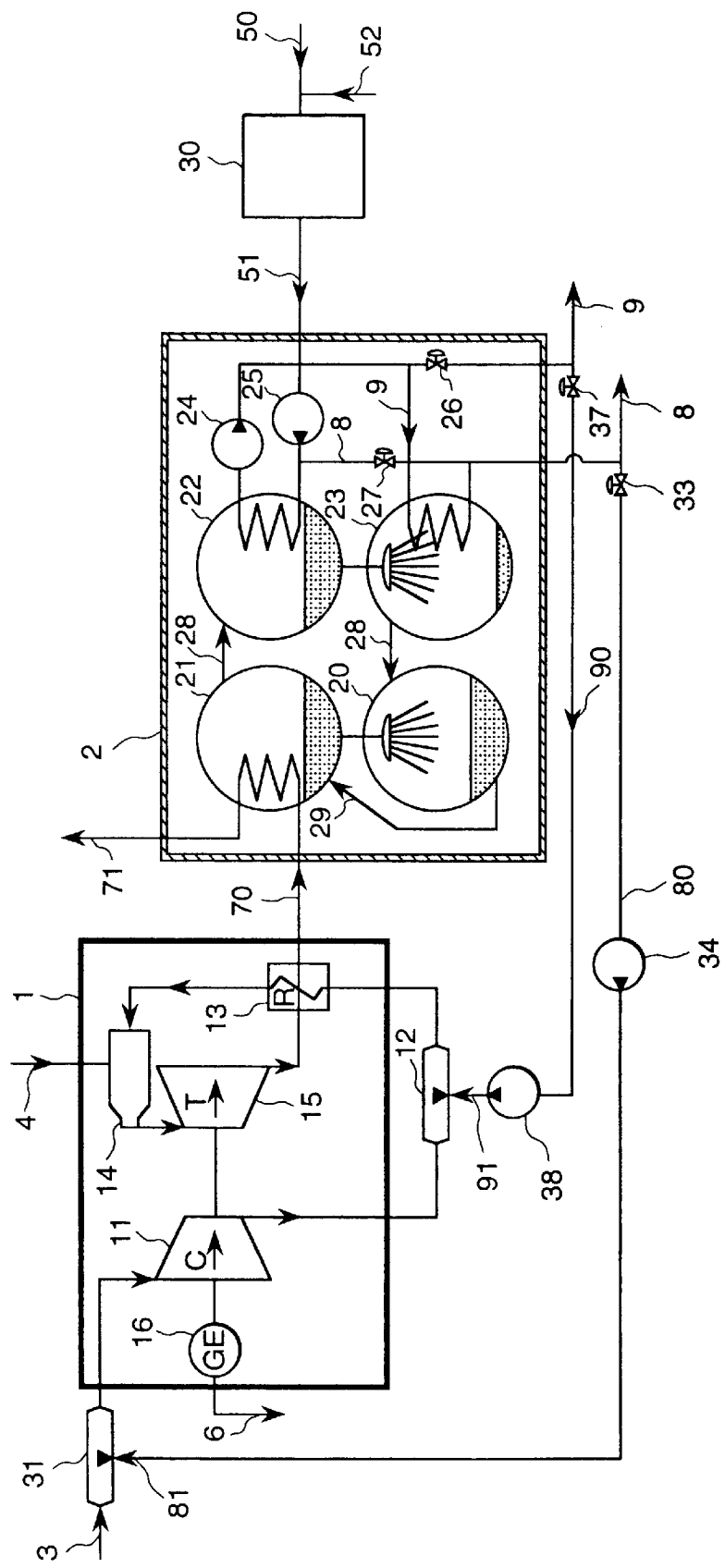
FIG. 1 is a schematic diagram of construction of a cold/heat/electric power supply system employing a regenerative gas turbine and an absorption refrigerator, of an embodiment of the present invention.

A cold/heat/electric power supply system of an embodiment of the present invention will be described hereunder, referring to FIG. 1. FIG. 1 shows the cold/heat/electric power supply system provided with a regenerative gas turbine 1 driving a generator 16, and an absorption refrigerator 2 supplied with water through a feed water treating apparatus 30 and supplying a demandant such as an air conditioning apparatus or the like with cold water 8 and hot water 9. Further, the system and its operation will be described in detail, referring to FIG. 1.

A spray device 31 for intake air is provided at an inlet of the regenerative gas turbine 1. The spray device 31 sprays cold water onto the air 3 taken in the gas turbine 1 to humidify and cool the air according to the circumference and operation conditions. The air taken in, that is, intake air is compressed by a compressor 11 and led to a humidifier 12. In the humidifier 12, hot water of necessary quantity is sprayed according to operation conditions such as power demand or the like and able to humidify the intake air. The intake air exiting from the humidifier 12 is led into a regenerative heat exchanger 13 in which the intake air recovers the heat of exhaust gas from a turbine 15 and is preheated thereby. The preheated intake air is mixed with fuel 4 in a combustor 14 and the mixture is burnt therein and flows into the turbine 15 as a high temperature gas. In the turbine 15, the high temperature gas expands to work, whereby output is obtained. The output drives the compressor 11 and the generator 16. The exhaust gas exiting from the turbine 15 is led into a regenerator 21 of the absorption refrigerator 2 as gas turbine exhaust gas 70 after the heat of the exhaust gas has been recovered in the regenerative heat exchanger 13. In the regenerator 21, the heat of the turbine exhaust gas 70 is recovered and finally exhausted out of the system as absorption refrigerator exhaust gas 71.

In the absorption refrigerator 2, the regenerator 21 recovers heat from the gas turbine exhaust gas 70 and evaporates a solvent from a dilute solution 29 to generate vapor 28. The vapor 28 generated in the regenerator is led to a condenser 22. The absorption refrigerator 2 has equipments for supplying feed water 50 from outside the equipment as treatment-finished feed water 51 by a feed pump 25 after treatment such as dust removal, water softening or the like is effected in the feed water treating apparatus 30, and is constructed so that water can be compensated by the amount of water consumed by the demandant or in the regenerative gas turbine 1. The feed water treating apparatus 30 is constructed so that the condensate 52 exhausted and recovered from a demandant such as air conditioning apparatus or the like also can be jointly supplied in addition to the feed water 50 from outside.

The supplemented treatment-finished water 51 and the water which is circulated by a recirculation pump 24 inside the absorption refrigerator 2 cool the vapor 28 in the condenser 22 and receive thereby heat from the vapor to turn into hot water 9. The generated hot water 9 is led to an evaporator 23 after the hot water of a quantity necessary for a demandant and the regenerative gas turbine 1 is branched by a hot water bypass valve 26 provided inside the absorption refrigerator 2. The inside pressure of the evaporator 23 is reduced to be about vacuum and the solvent condensed in the condenser 22 evaporates due to reduced pressure and is turned into vapor 28 again. In this case, latent heat is taken out from the hot water 9, whereby water exiting from the evaporator 23 becomes cold water 8. The vapor generated in the evaporator 23 is led to an absorber 20 and absorbed in a solution concentrated in the regenerator 21 thereby to become a dilute solution 29. The dilute solution 29 is sent to the regenerator 21. The cold water 8 generated in the evaporator 23 is recirculated by an optimum quantity regulated by a cold water bypass valve 27 according to the operation conditions inside the absorption refrigerator 2, and then the remaining cold water is taken out of the absorption refrigerator 2 and supplied to a demandant such as an air conditioning apparatus or the like or to the regenerative gas turbine 1 through a branch valve 33.

Next, in the cold/heat/electric power supply system of the present embodiment, in the case where the absorption refrigerator 2 generates cold/heat in excess, an operation (control) method of supplying the excess heat quantity to the regenerative gas turbine 1 and improving thereby the electric power output and power generation efficiency will be explained.

In the cold/heat/electric power system of construction as mentioned above, a supply ratio of cold water/hot water can be set freely by regulating the opening of each of the hot water bypass valve 26 and cold water bypass valve 27, so that in the case where any of cold water and hot water is generated in excess, the excess heat can be taken in any form such as cold water or hot water. In the case where it is sufficient to be small in excess heat and in increment of power generation terminal output, the excess heat is taken out as cold water, and the cold water branch valve 33 is opened and gas turbine supply cold water 80 is supplied to the spray device 31 for intake air through a cold water feed pump 34 to humidify and cool the intake air by spray water 81 for intake air, whereby it is effective to reduce power necessary for the compressor by reducing a thermal drop in the compressor of the regenerative gas turbine and improve the power generation terminal output and power generation efficiency. Further, since a mass flow increases by the humidification, the effect become large without greatly decreasing the intake air temperature, as a result, there is an advantage that only very small amount of cold water is consumed.

The spray water 81 for intake air can attain a reducing effect of the compressor power through a change in specific heat ratio due to humidification even if the spray water 81 is sprayed at a very small flow rate such as about 0.01 wt % of the air mass flow rate. By spraying water of a slight amount about 0.01 wt % of the air flow rate, the intake air of the regenerative gas turbine 1 is humidified to an extent that the intake air reaches the saturated steam pressure. A temperature decrease in the intake air by this humidification is about 0.2° C. or so, however, the compressor efficiency is improved 0.4 to 0.5% at relative value by decrease in specific heat ratio, and about 1.2% of the compressor power can be reduced. Additionally, in order to surely evaporate the spray water 81 for intake air and rapidly humidify the intake air to the saturated condition, a flow rate of water of about 0.2 wt % of the air mass flow rate is optimum. In this case, of cold water droplets which have-reached a state of equilibrium but have not evaporated as yet under the saturated condition, large diameter droplets are discharged out and recovered as drain, and fine droplets are delivered through the compressor 11 together with the intake air and evaporate at the delivery port, whereby the same effect as water of a very small quantity has been humidified by the humidifier 12 can be attained.

For example, when cold water of 0.2 wt % of an intake air mass flow rate is used as spray water 81 for humidifying and cooling the intake air, about 3.4% of the power generation output and about 2.9% of power generation efficiency are improved. In the case where further excess heat exists, the excess heat is taken out as hot water, that is, the hot water branch valve 37 is opened and branch hot water 90 is sent to the humidifier 12 by a hot water pump 38 and sprayed as supply hot water 91 by the humidifier 12, whereby the power generation output and power generation efficiency each are improved further greatly. When this operation is taken, it is more effective to increase a fuel flow rate and raise a little a set temperature at the turbine inlet. The reason is that because of latent heat taken when the hot water supplied by the humidification evaporates, there are brought about an effect that the phenomenon that the air temperature is lowered at the inlet of the combustor is damped irrespective of increase of a regenerative heat exchanging amount and an effect that it is avoided to become unstable in combustion under the condition that a lot of steam exists. Further, in this case, even if a turbine inlet temperature (combustion temperature) is raised, a lot of steam exists in the combustion place, so that emission of nitrogen oxides ($NO_x$) does not increase.

In Table 1, there is shown an operation example in which the excess heat is taken out as cold water and hot water, intake air is spray-cooled and humidified at the compressor delivery port, whereby the power generation output and power generation efficiency are improved. In the example, a cold/heat/electric power supply system is used, which employs a regenerative gas turbine-driven generator of rated revolution of 65,000 rpm having a generation output of 75 kW under the condition that the surrounding air temperature is 15° C. and the relative humidity is 30%.

TABLE 1

| Items | | Prior art | Embodiment | Effect (rel. %) |
|---|---|---|---|---|
| Power generation output | (kW) | 75 | 90 | +20.2% |
| Power generation terminal efficiency | (%) | 29.9% | 32.8% | +9.6% |
| R.P.M. | (rpm) | 65000 | | — |
| Compression ratio | (–) | 4.0 | | — |
| Compressor efficiency | (%) | 79.0% | 79.5% | +0.5% |
| Turbine efficiency | (%) | 82.1% | 81.8% | –0.3% |
| Inlet air temp. | ° C. | 15.0 | 14.8 | — |
| Regenerator inlet temp. | ° C. | 191 | 144 | — |
| Combustor inlet temp. | ° C. | 616 | 610 | — |
| Turbine inlet temp. | ° C. | 930 | 950 | — |
| Exhaust gas temp. | ° C. | 256 | 204 | — |
| Compressor power | (kW) | 120 | 118 | –1.2% |
| Turbine output | (kW) | 214 | 232 | +8.2% |

TABLE 1-continued

| Items | | Prior art | Embodiment | Effect (rel. %) |
|---|---|---|---|---|
| Regenerative heat exchanging amount | (kW) | 306 | 382 | +24.9% |

In Table 1, a row of a prior art shows results in the case where the operation method of improving electricity output and power generation efficiency according to the present embodiment is not taken. A row of the present embodiment shows results in the case where the operation method of improving electricity output and power generation efficiency according to the present embodiment is taken. A row of effects shows, by relative values (%) to the prior art, the results in the case where the operation method of the present embodiment is applied. In the operation example shown in Table 1, cold water of 7° C. is supplied at a flow rate 0.2 wt % of an air flow rate as spray water for intake air, and hot water of 80° C. is supplied at flow rate of 3 wt % of the air flow rate as humidification water. 50% of the spray water for intake air is discharged as drain and recovered. Further, in order to secure the stability of combustion, the turbine inlet temperature (combustion temperature) is raised by 20° C.

As a result, as shown in Table 1, 0.5% of the compressor efficiency is improved by spraying onto intake air and 1.2% of the compressor power is reduced. Further, a regenerative heat exchanging amount is increased about 25% by an effect of humidification and the turbine output is increased by about 8%. The reason that the turbine efficiency is decreased by 0.3% is that the specific heat ratio decreases by the humidification, however, the regenerative heat exchanging amount increases greatly, so that the decrease of the turbine efficiency does not cause a bad influence.

Next, in the cold/heat/electric power supply system shown in FIG. 1, an effect of damping the decrease of power generation output and power generation efficiency of the regenerative gas turbine in summer in the case where the method according to the present invention is used will be described.

Figure 3:
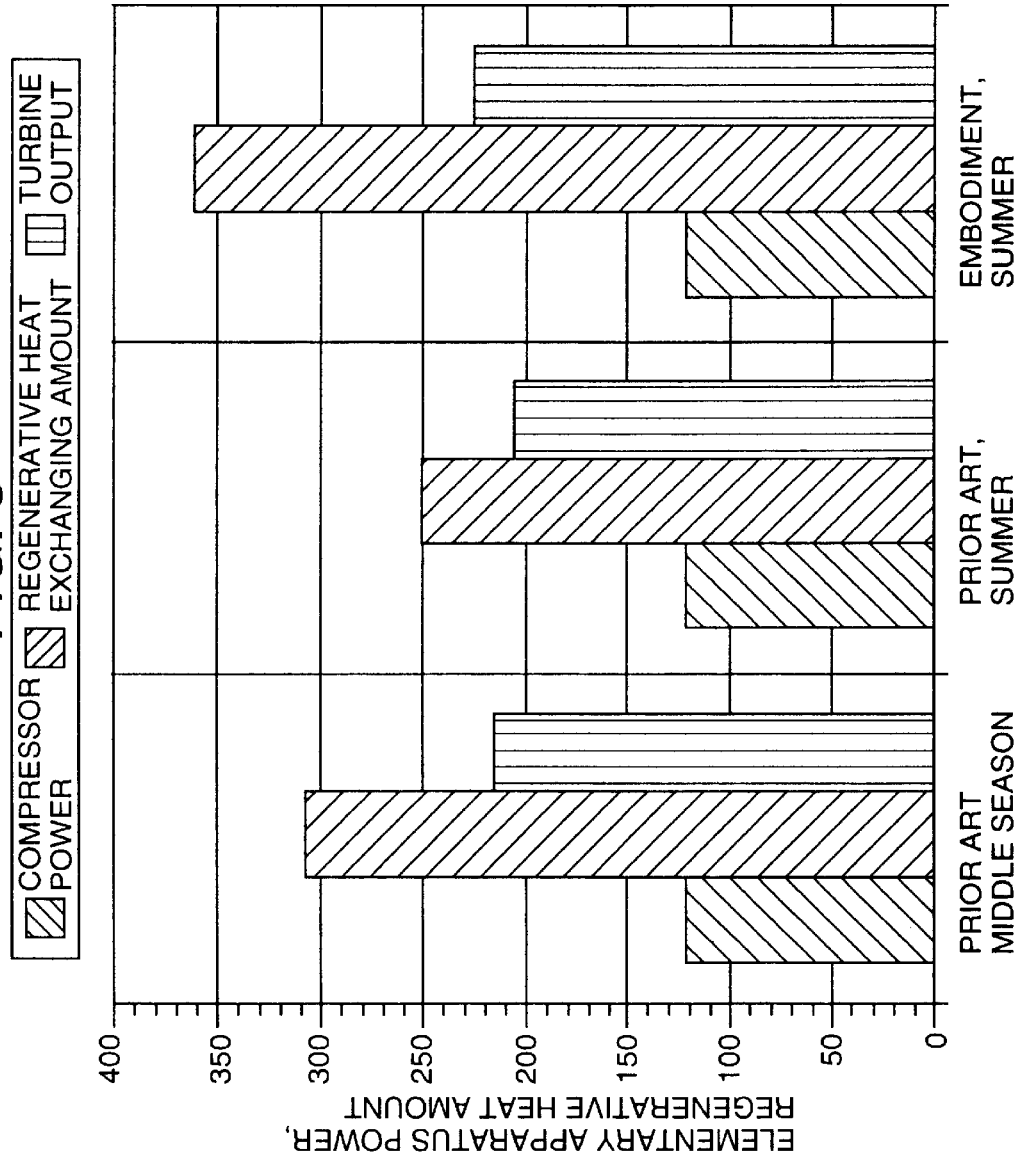
FIG. 3 is a graph showing a compressor power, regenerative heat exchanging amount and gas turbine output in summer, in middle season in the case where electric output is increased in cold/heat/electric power supply systems according to an embodiment of the present invention and according to a prior art, respectively.

In summer as mentioned above, air density decreases according to increase of the atmospheric temperature, whereby a mass flow rate of the air taken in the compressor 11 decreases and the power generation output and power generation efficiency decreases. However, in the cold/heat/electric power supply system of construction having the humidifier 12 and spray device 31 for intake air as shown in FIG. 3, humidification and cooling by cold water and humidification by hot water, as mentioned above are effected, whereby it is possible to not only damp the decrease of the power generation output and power generation efficiency but rather to improve them.

In the present embodiment, provided is the humidifier 12 for injecting hot water generated in the absorption regenerator 2 onto the air delivered from the compressor 11 of the regenerative gas turbine 1 and humidifying greatly the air to be supplied to the regenerative heat exchanger 13, combustor 14 and turbine 15. Although humidification of the air also can be effected by the above-mentioned spray device 31 for intake air, an atmospheric temperature is about 40° C. at highest and atmospheric pressure also is about 100 kPa and low in the case of use of the spray device 31, so that saturated steam pressure is low and it can not be desired to humidify greatly by the spray device 31. However, the air delivered from the compressor 11 has been raised in temperature and pressure by compression of the air in the compressor 11, so that it is possible to humidify greatly. For example, even in the case where a regenerative gas turbine of relatively small size such that a compression ratio is about 3.5 to 4 or so is supposed, it is possible to effect humidification with hot water of about 1 wt % of the air flow rate until the air reaches the saturated state. Further, it is unnecessary that all the supplied water has evaporated within the humidifier, and since any problems do not occur on operation of apparatuses unless finally any bad affection due to water droplets is imparted on the combustor and turbine, more humidification is possible.

Further, in the heat and electric power supply equipment with the humidifier 12 of the present embodiment, by humidifying the air to be supplied to the turbine with a lot of water, an effect of improvement of the heat transfer efficiency other than increase in mass flow rate in the regenerative heat exchanger 13, an effect of suppression of nitrogen oxides ($NO_x$) due to existence of steam in the combustor 14 and an effect of increase in output due to increase in mass flow rate in the turbine 15 each can be expected. For example, in the case where humidification is effected with 3 wt % of an air flow rate in the humidifier 12, in the regenerative heat exchanger 13, since (1) an effective temperature difference due to decrease in air temperature at the regenerative heat exchanger inlet expands, (2) the heat transfer efficiency due to mixture of steam with the air is raised and (3) the latent heat of water flowing into the regenerative heat exchanger as liquid droplets also is contributed to a heat amount regenerated, a regenerative heat exchanging amount increases about 20%, the turbine output also increases about 7% at relative value and the power generation terminal output and power generation efficiency each are improved greatly.

Figure 2:
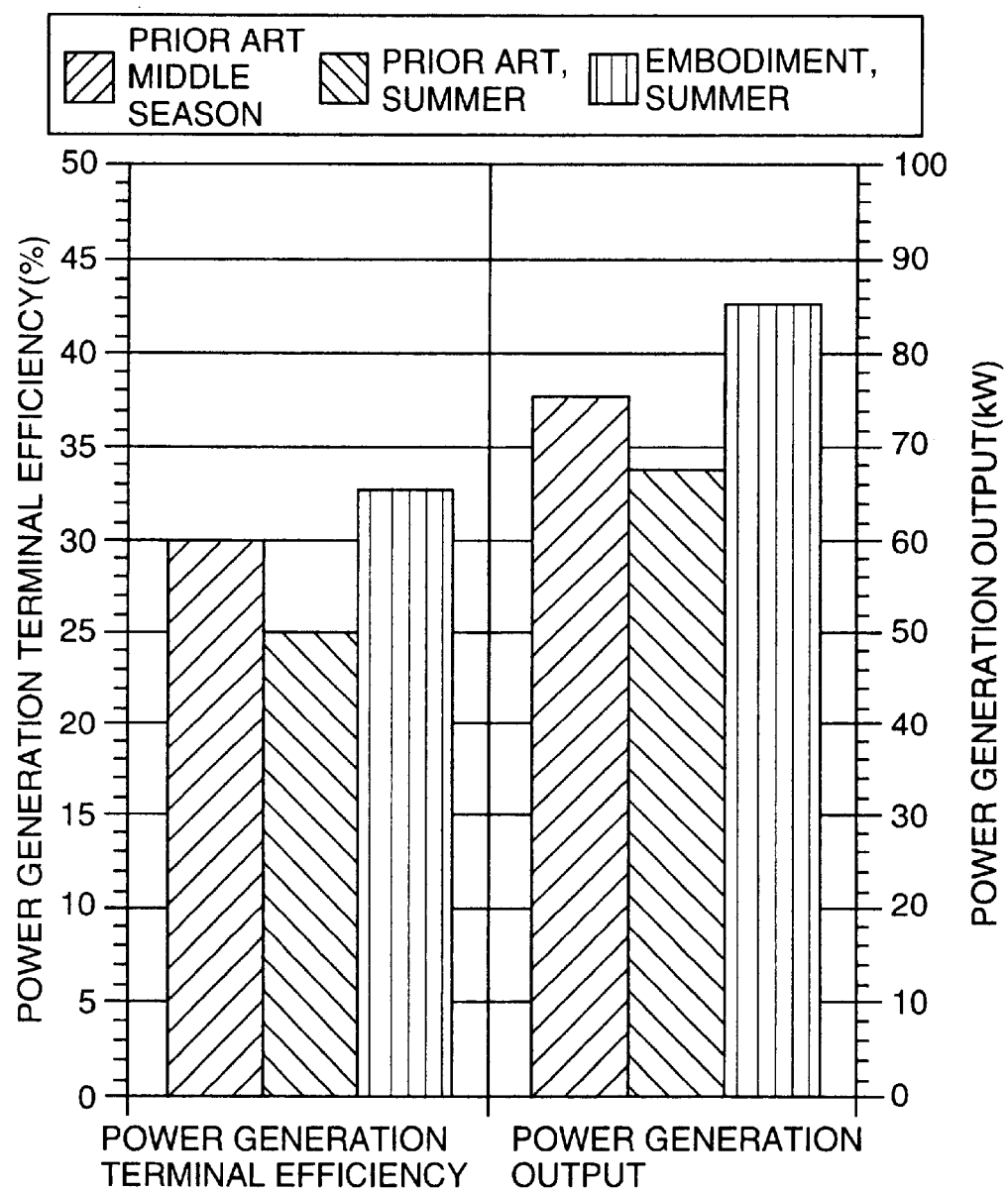
FIG. 2 is a graph showing comparison of power generation efficiency and power generation output between in the case where a conventional system used in middle season, in the case where electric output is increased by applying a method of an embodiment of the present invention in a cold/heat/electric power supply system and in the case where the conventional method is used in summer.

FIG. 2 shows, in a cold/heat/electric power supply system using a regenerative gas turbine-driven generator of rated revolutions of 65,000 rpm and power generation output of 75 kW taken as an example in Table 1, comparison between the power generation terminal efficiency and power generation output (prior art in middle season) under the operation condition of ambient air temperature 15° C. and relative humidity 30%, power generation terminal efficiency and power generation output under the operation condition of ambient air temperature 38° C. and relative humidity 60% as a representative operation condition (prior art in summer), and power generation terminal efficiency and power generation output (present embodiment in summer) in the case where the humidification and cooling by cold water and the humidification by hot water according to the operation method of the present embodiment are used. Here, also, the results under the operation conditions that cold water of 7° C. is supplied at a flow rate of 0.2 wt % of the air flow rate as spray water for intake air and hot water of 80° C. is supplied at a flow rate of 3 wt % of the air flow rate as water for humidification are shown as an example. 50% of the spray water for intake air was exhausted and recovered as drain water. Further, in order to secure the stability of combustion, a turbine inlet temperature (combustion temperature) was raised by 20° C.

In the conventional cold/heat/electric power supply system, the power generation output and power generation efficiency decrease about 11% and about 16%, respectively, in summer because of decrease in air mass flow rate. However, in the case where the operation method of the present embodiment is used, the power generation output and power generation efficiency are improved by about 12% and about 10%, respectively. For more detailed explanation of the effects, FIG. 3 shows compressor power, regenerative heat exchanging amount and turbine output under each operation condition shown in FIG. 2.

In the prior art, in middle season and summer the compressor power does not almost change, but, the regenerative heat exchanging amount decreases greatly because of decrease in air mass flow rate, and the turbine output decreases also. However, when the present embodiment is used, the mass flow rate is increased by humidification and the regenerative heat exchanging amount is increased greatly by latent heat of hot water supplied for humidification, whereby the regenerative heat exchanging amount is large even in summer and the turbine output also is large compared with that in the middle season by the prior art in which humidification is not effected. Thereby, when the construction and operation method of the present embodiment as mentioned above are employed, it is possible to improve the power generation output and power generation efficiency even in summer.

Figure 4:
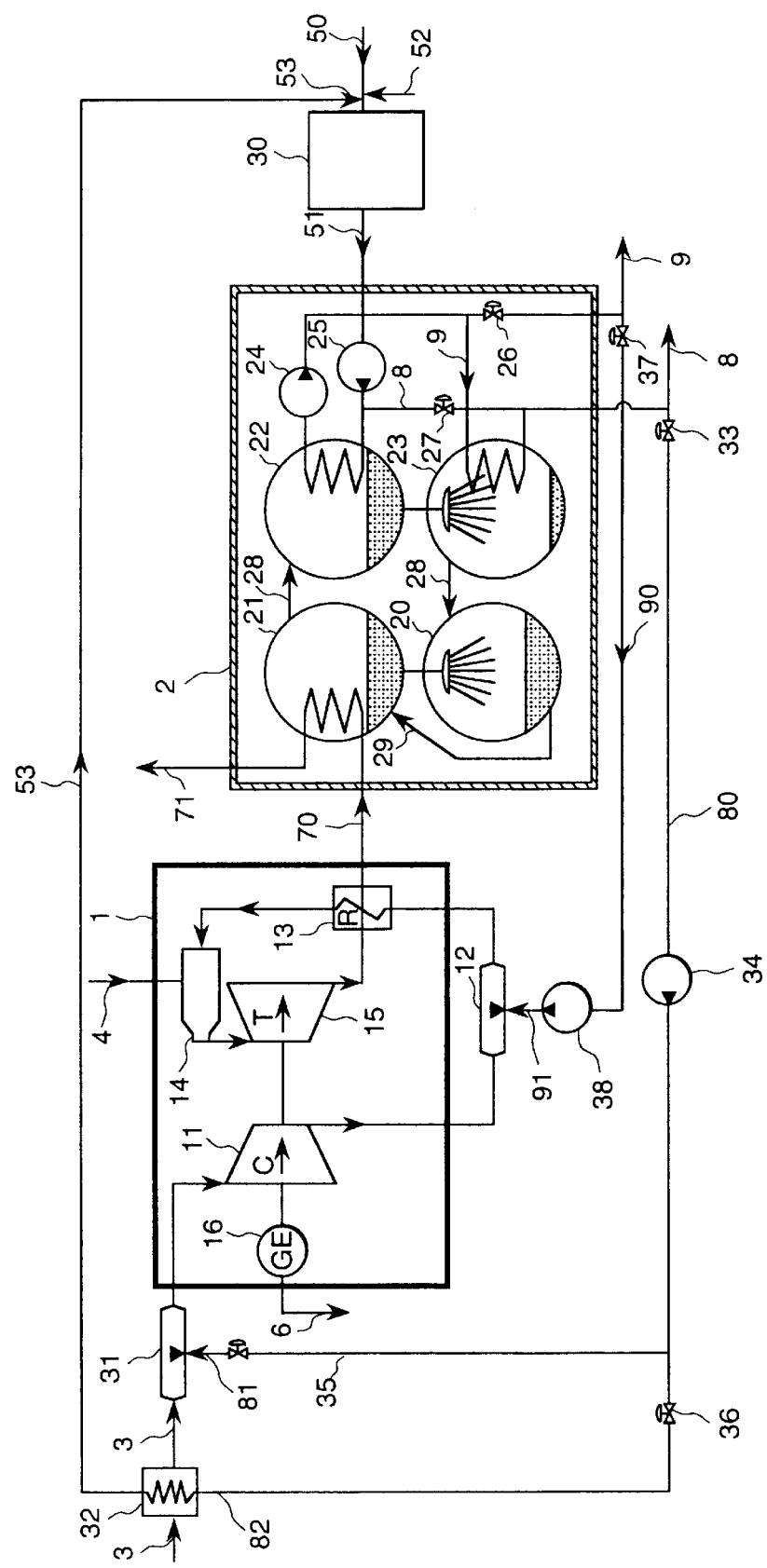
FIG. 4 is a schematic diagram of a construction of a cold/heat/electric power supply system of another embodiment of the present invention.

FIG. 4 shows a cold/heat/electric power supply system of another embodiment of the present invention. The same constructions as in FIG. 1 are omitted to explain here, again. In the present embodiment, in order to further raise the improving effects of power generation output and power generation efficiency in summer, an intake air cooling device 32 for cooling the inlet air by heat exchange between cold water and the intake air is provided upstream of the spraying device 31 for intake air. The intake air cooling device 32 can supply inlet air cooling water 82 through an inlet air cooling device flow adjusting valve 36 in such a cases that excess cooling water is generated, an ambient temperature is particularly high in summer, and so on. Intake air cooling water 53 from the intake air cooling device 32 is recovered in an inlet of the feed water treating device 30 and circulates inside the cold/heat/electric power supply system.

Figure 5:
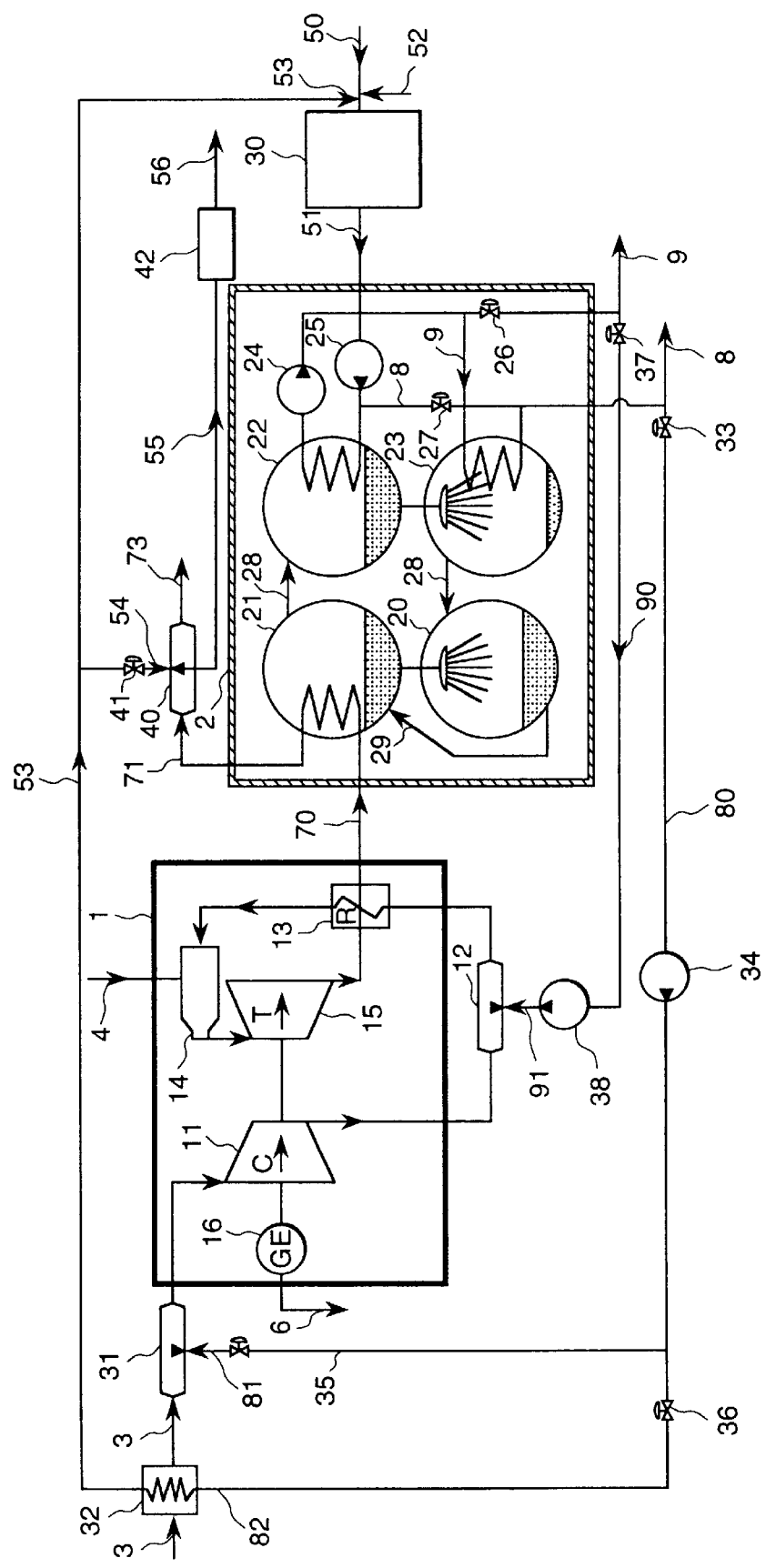
FIG. 5 is a schematic diagram of a construction of a cold/heat/electric power supply system of another embodiment of the present invention.

FIG. 5 shows a cold/heat/electric power supply system of another embodiment of the present invention. The same constructions as mentioned above are omitted to explain further. In the present embodiment, a water recovery device 40 is added to the construction of the embodiment shown in FIG. 4. That is, in the present embodiment, the water recovery device 40 for recovering water in the absorption refrigerator exhaust gas 71 exhausted from the absorption refrigerator 2 (regenerator 21) is provided. When operation control of spraying over the intake air and humidification of compressor delivery air is carried out by employing the present embodiment, water of several % of the intake air mass flow rate is consumed, so that in some cases a lot of water is included in the absorption refrigerator exhaust gas 71. The water recovery device 40 is provided for recovering the water from the absorption refrigerator exhaust gas 71 and effectively using the water as cleaning water or the like. A part of the intake air cooling water 53 led from the intake air cooling device 32 is branched by a water recovering flow adjusting valve 41 and sprayed as a water recovery device spray water 54 into the water recovery device 40, whereby direct heat exchange is effected and the water in the exhaust gas 71 is recovered.

According to this recovering method, it is possible to recover most of the water in the exhaust gas 71 without greatly increasing exhaust gas pressure loss, however, it also is possible to provide a water recovery device of heat exchanger type which uses the intake air cooling water 53 as a cooling water. The recovery water 55 recovered in the water recovery device 40 is subjected to dust removal or pH adjustment by a recovery water treatment device 42 and used as treatment-finished recovery water 56. The treatment-finished recovery water is suitable for use as cleaning water in various equipments.

Figure 6:
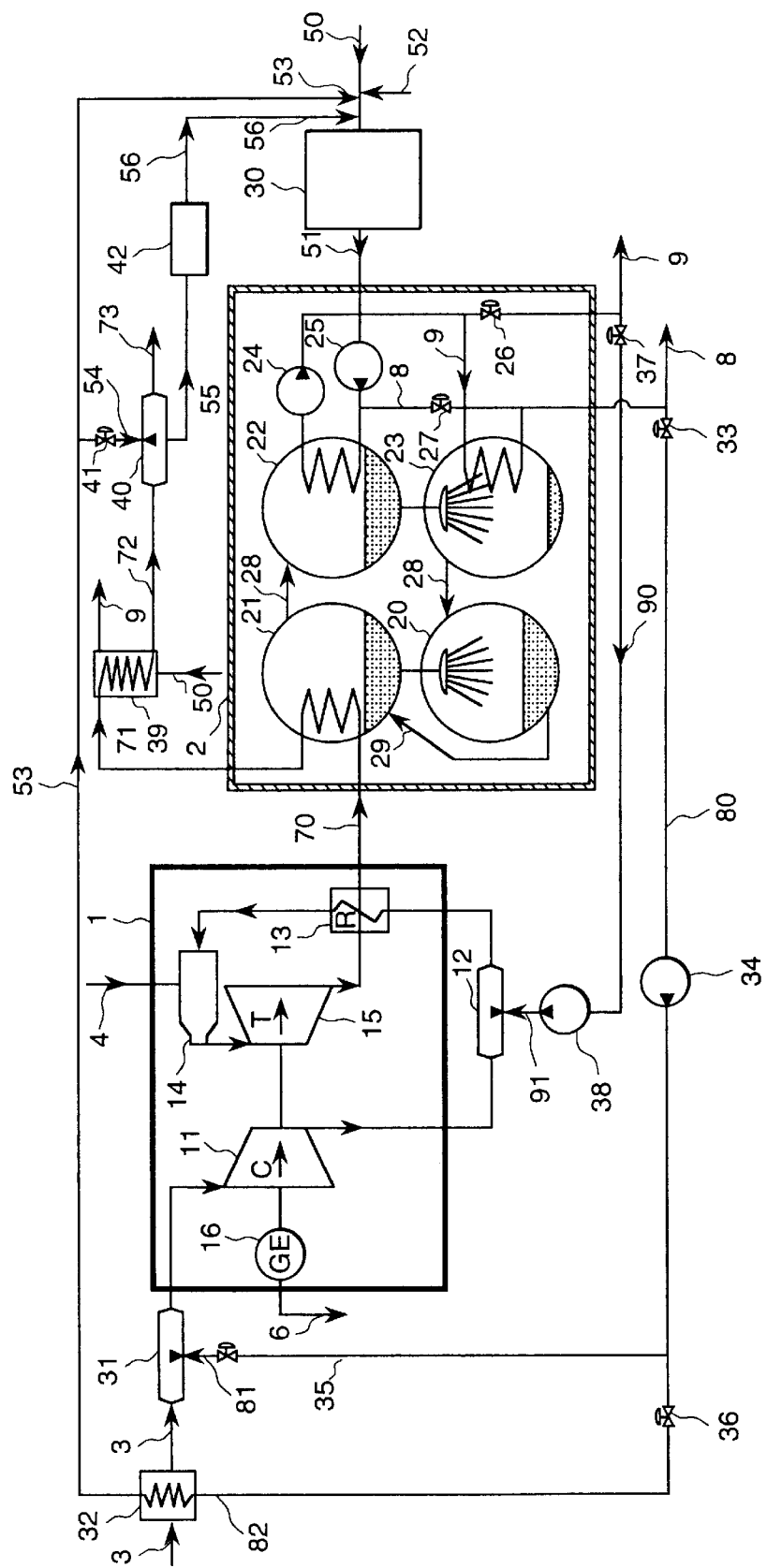
FIG. 6 is a schematic diagram of a construction of a cold/heat/electric power supply system of another embodiment of the present invention.

FIG. 6 shows a cold/heat/electric power supply system of another embodiment of the present invention. The same constructions as mentioned above are omitted to explain further. In the present embodiment, a heat accumulation type heat exchanger 39 is added to the construction of the embodiment shown in FIG. 5. That is, in the present embodiment, the heat accumulation type heat exchanger 39 is provided for causing the absorption refrigerator exhaust gas 71 exhausted from the absorption refrigerator 2 (regenerator 21) to heat-exchange with feed water 50. The heat exchanger exhaust gas 72 cooled in the heat accumulation type heat exchanger 39 is led to the water recovery device 40 to recover water in the exhaust gas. Further, the feed water heated through heat exchange with the absorption refrigerator exhaust gas 71 in the heat accumulation type heat exchanger 39 is supplied to hot water-utilizing apparatuses not shown as hot water 9.

Generally, the absorption refrigerator exhaust gas 71 is still kept hot 120° C. or more even after exhaust heat is recovered, and the heat of the exhaust gas 71 is wasted out of the system. However, even if it is tried to effectively use the heat, since a temperature drop is small, an amount of hot water generated thereby does not become large, and economical advantages are small by an amount corresponding to an increase in mechanical complexity. Therefore, in the present embodiment shown in FIG. 6, as mentioned above, such a construction is taken that the heat accumulation type heat exchanger 39 is provided in an exhaust path of the absorption refrigerator 2, the heat from exhaust heat of the absorption refrigerator exhaust gas 71 is recovered and accumulated, and hot water is generated by supplying the feed water 50 to the heat accumulation type heat exchanger 39 when a demand of hot water becomes large.

In this manner, the exhaust heat is accumulated and recovered to generate hot water according to a demand, whereby it is possible to further improve the efficiency of exhaust heat recovery and use. Further, in the present embodiment shown in FIG. 6, recovery water 55 from the water recovering device 40 is subjected to dust removal or pH adjustment in the recovery water treatment device 42, and returned into a supply port of the feed water treatment device 30 as treatment-finished water 56, whereby an recirculation amount of water within the cold/heat/electric power supply equipment is increased and a feed water amount to the equipments is reduced.

Figure 7:
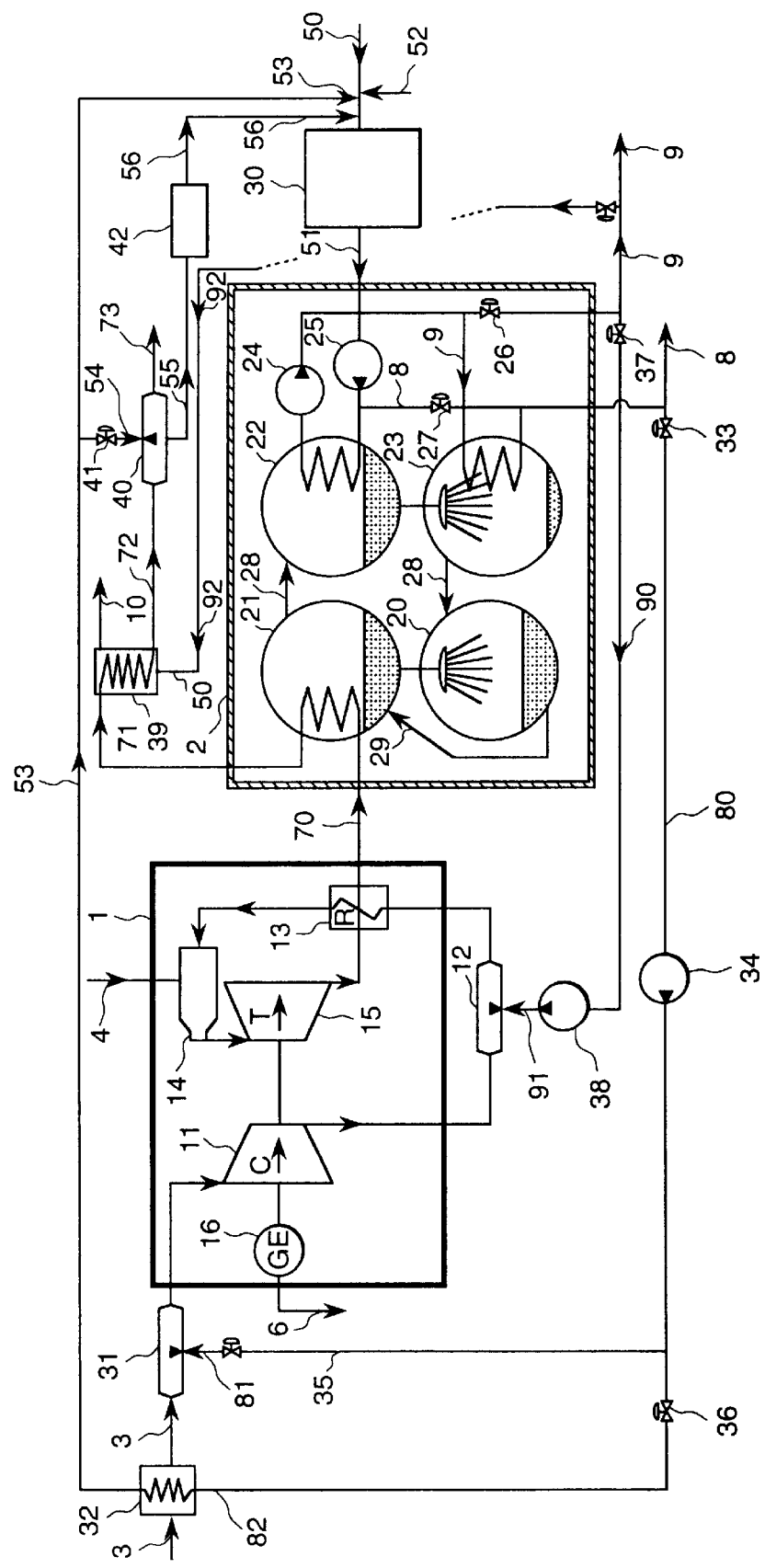
FIG. 7 is a schematic diagram of a construction of a cold/heat/electric power supply system of another embodiment of the present invention.
Figure 8:
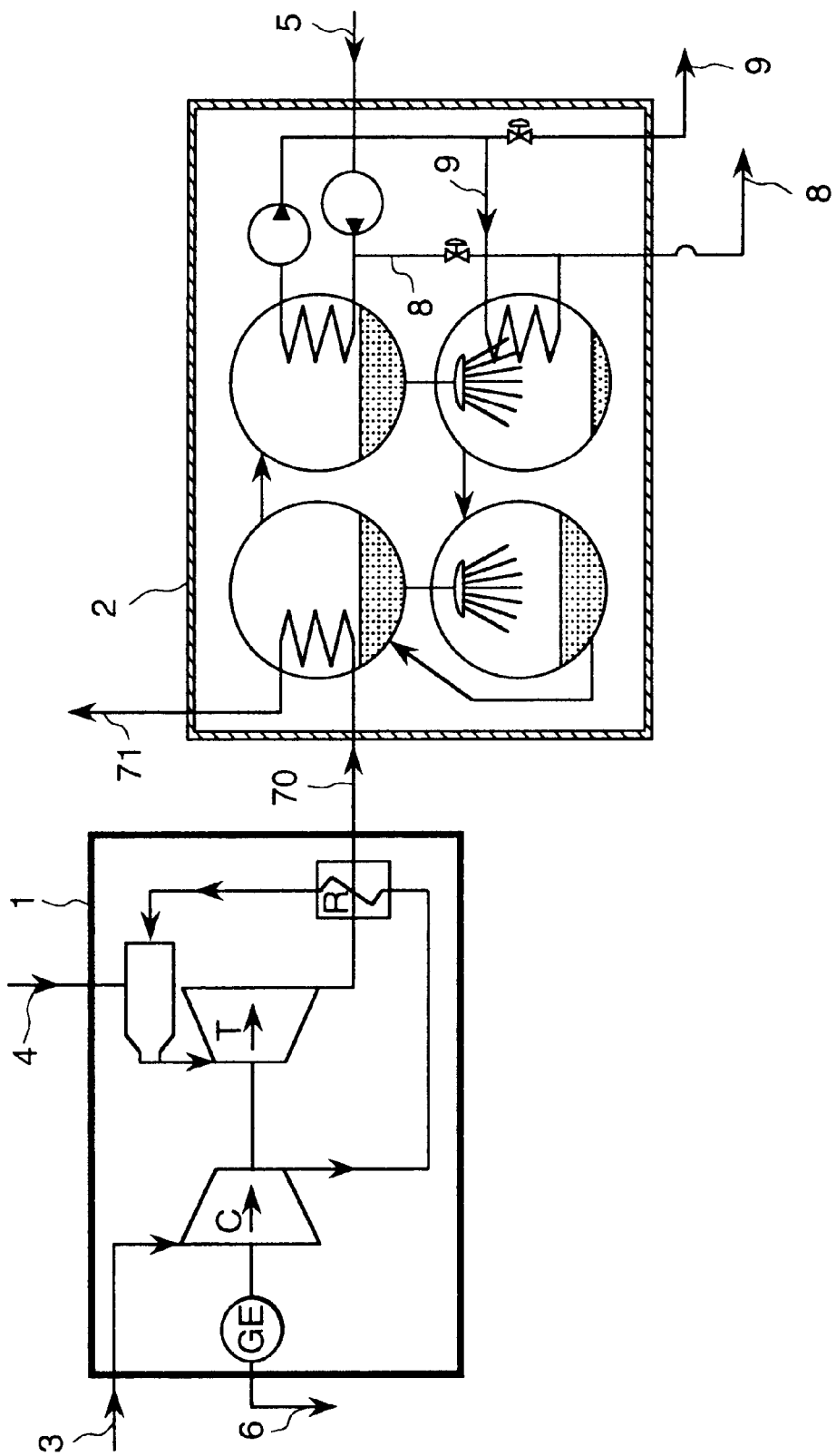
FIG. 8 is a schematic diagram of a conventional construction of a cold/heat/electric power supply system employing a regenerative gas turbine and an absorption refrigerator.

FIG. 7 shows a cold/heat/electric power supply system of another embodiment of the present invention. The same constructions as mentioned above are omitted to explain further. In the present embodiment, water is not supplied to the heat accumulation type heat exchanger as feed water 50 as in the construction of the embodiment shown in FIG. 6, but steam 10 is generated by using the hot water 9 generated in the absorption refrigerator 2. By recovering exhaust heat by the heat accumulation type heat exchanger 39 as mentioned above, it is possible to recover and accumulate the exhaust heat corresponding to the capacity of the heat accumulation type heat exchanger 39 as long as it is not required, and it also is possible to discharge all of it at a time thereby to generate steam 10 from the hot water 9. In some cases, steam for sterilization is intermittently necessary in food factories or the like. The system as shown in FIG. 7 is suitable for such use.

As has been explained above, in the heat and electric power supply system of the present embodiment, a heat/electricity ratio-variable operation which could not be effected by a conventional cold/heat/electric power supply system, that is, an operation which supplies excess heat to the regenerative gas turbine and improves the power generation output and power generation efficiency when excess cold/heat is generated in the absorption refrigerator can be carried out. Further, in the present embodiment, it is possible to improve, by using a part of the cold/heat generated in the absorption refrigerator, the characteristics that the power generation terminal output and power generation efficiency decreases due to an decrease in air density caused by rising in ambient temperature in summer.

According to the present invention, it is possible to provide a heat and electric power supply system and an operation method thereof which enable the power generation output to increase.

What is claimed is:

1. A heat and electric power supply system comprising:
   gas turbine equipment for generating electric power;
   an absorption refrigeration unit for recovering exhaust heat from said gas turbine equipment and cooling or heating water; and
   a humidifier for spraying water heated in said absorption refrigeration unit onto compressed air of said gas turbine equipment.

2. A heat and electric power supply system according to claim 1, wherein said gas turbine equipment has a regenerative heat exchanger for recovering heat from gas turbine exhaust gas and heating the compressed air to be supplied to a gas turbine, and said humidifier spraying the water onto the compressed air to be supplied to said regenerative heat exchanger, and wherein a spray device for spraying water cooled in said absorption refrigeration unit onto intake air of said gas turbine equipment is provided.

3. A heat and electric power supply system according to claim 1, wherein a water recovery device for recovering water contained in exhaust gas passed through said absorption refrigeration unit is provided.

4. A heat and electric power supply system according to claim 1, wherein a heat accumulation type heat exchanger for recovering and accumulating exhaust heat from exhaust gas passed through said absorption refrigeration unit is provided.

5. A heat and electric power supply system according to claim 2, wherein a water recovery device for recovering water contained in exhaust gas passed through said absorption refrigeration unit is provided.

6. A heat and electric power supply system according to claim 2, wherein a heat accumulation type heat exchanger for recovering and accumulating exhaust heat from exhaust gas passed through said absorption refrigeration unit is provided.

7. An operating method of a heat and electric power supply system comprising gas turbine equipment for generating electric power and an absorption refrigeration unit for recovering exhaust heat from said gas turbine equipment and cooling or heating water, comprising the step of
   spraying water heated in said absorption refrigeration unit and humidifying compressed air to be supplied to a turbine.

8. An operating method of a heat and electric power supply system comprising gas turbine equipment having a regenerative heat exchanger for recovering heat from turbine exhaust gas and heating compressed air to be supplied to a turbine, and an absorption refrigeration unit for recovering exhaust heat from said gas turbine equipment and cooling or heating water, comprising the steps of
   spraying water cooled in said absorption refrigeration unit onto intake air of said gas turbine equipment; and spraying water heated in said absorption refrigeration unit onto compressed air to be supplied to said regenerative heat exchanger.

9. An operating method of a heat and electric power supply system according to claim 7, further comprising the steps:

recovering and accumulating exhaust heat from exhaust gas passed through said absorption refrigeration unit; and producing hot water by using the exhaust heat accumulated in said recovering and accumulating step when a hot water demand occurs.

10. An operating method of a heat and electric power supply system according to claim 7, further comprising the step of:

increasing a flow rate of fuel supplied to a combustor of said gas turbine equipment in the case where humidifying is effected.

11. An operating method of a heat and electric power supply system according to claim 8, further comprising the steps:

recovering and accumulating exhaust heat from exhaust gas passed through said absorption refrigeration unit; and producing hot water by using the exhaust heat accumulated in said recovering and accumulating step when hot water demand occurs.

12. An operating method of a heat and electric power supply system according to claim 8, further comprising the step of:

increasing a flow rate of fuel supplied to a combustor of said gas turbine equipment in the case where humidifying is effected.

* * * * *